July 9, 1957      E. F. DOWNEY      2,798,335
SEED STARTING AND PLANT PROPAGATING RECEPTACLES
Filed Aug. 6, 1954
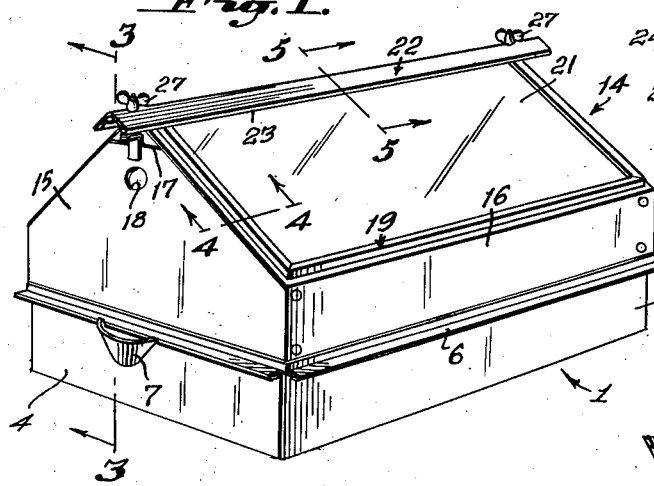
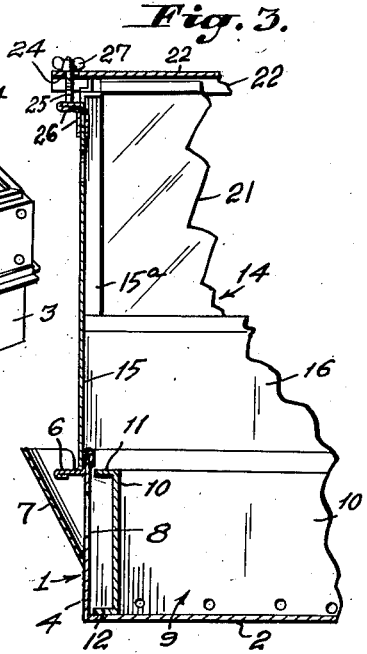
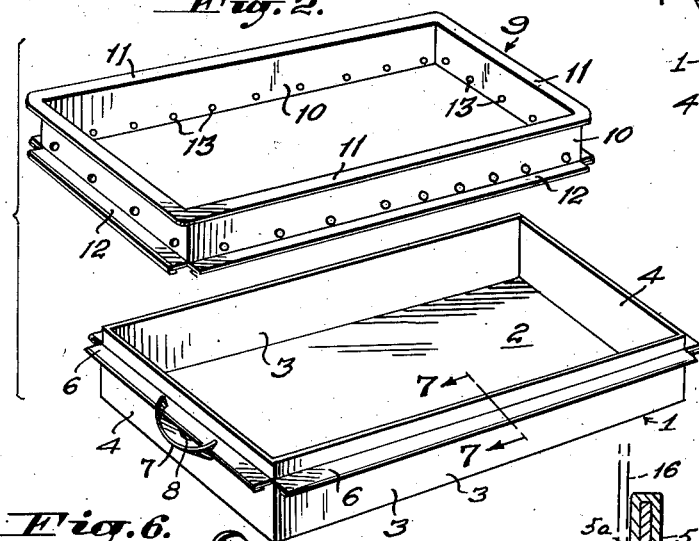
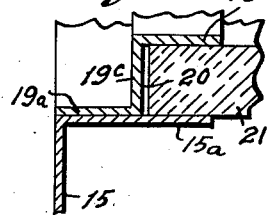
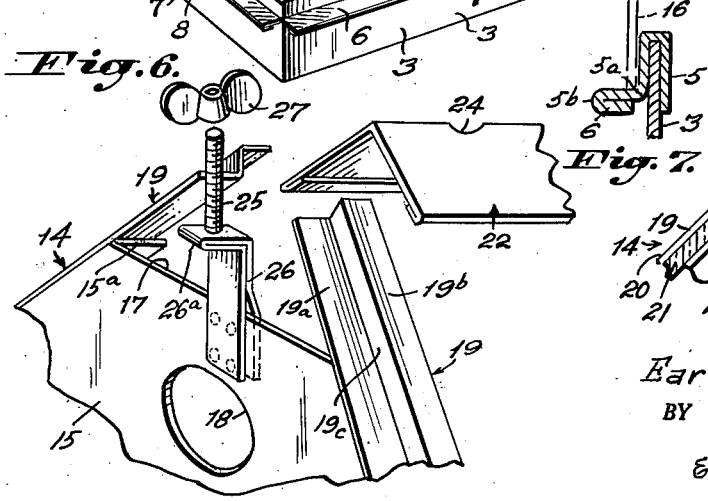
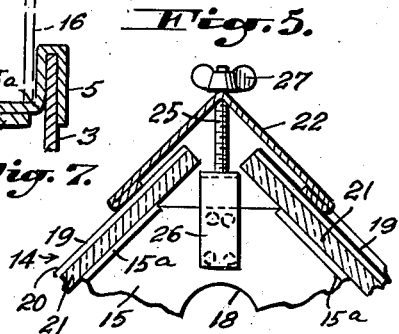
INVENTOR.
Earl F. Downey
BY
Elizabeth Newton Dew
Attorney.

United States Patent Office 2,798,335
Patented July 9, 1957

2,798,335

SEED STARTING AND PLANT PROPAGATING RECEPTACLES

Earl F. Downey, Arlington, Va.

Application August 6, 1954, Serial No. 448,181

3 Claims. (Cl. 47—19)

This invention relates to seed starters and plant propagators.

It is the chief object of my invention to provide a seed starter and plant propagator which is relatively simple and inexpensive to construct and use while, at the same time, extremely efficient in the nurture of seedlings and plants during the initial stages of their growth.

Another object is to provide a device of the nature stated, which is readily portable and demountable for planting or setting of seeds and young plants or cuttings.

A further object is to provide a seed starter and plant propagator wherein an inner section cooperates with the base to afford a liquid reservoir about the body of soil and also forms a dead air space for reducing extremes of temperatures within the enclosure.

A still further object is to provide a seed starter and plant propagator wherein a bottom section and a top section are separably related and wherein panes of glass or other translucent materials are securely but removably held by the top section to complete the enclosure and to afford ease of cleaning and replacement of the panes when desired.

Yet another object is to provide a structure of the type mentioned wherein the translucent panes are slidably positioned within channels about all but their top edge, with a removable ridge piece completing the assembly.

Other objects and advantages will become obvious after a study of the following description in connection with the accompanying drawing.

In the drawings:

Figure 1 is a perspective view of a preferred form of the invention as it appears completely assembled;

Figure 2 is an exploded perspective view showing the base and inner section;

Figure 3 is a detail perspective section to an enlarged scale and taken in a central longitudinal vertical plane as identified by the line 3—3, Figure 1;

Figure 4 is a sectional detail view taken in a plane identified by the line 4—4, Figure 1;

Figure 5 is a sectional detail view of the ridge construction taken in a plane identified by the line 5—5, Figure 1;

Figure 6 is an exploded view to an enlarged scale of the ridge construction; and Figure 7 is a detail sectional view taken on line 7—7, Figure 2, showing the combined reinforcement strip and supporting flange of the base section.

Referring in detail to the drawing wherein like reference numerals identify the same parts throughout, 1 identifies generally a rectangular base which may be of sheet metal, plastic or other suitable sheet material. As shown, base 1 is of relatively thin gage galvanized sheet steel and includes a flat bottom 2 having sides 3 and ends 4 upturned along lines defining the edges of the bottom and united by welding, soldering, or riveting along their meeting vertical edges to form a water-tight base. As shown at Figures 3 and 7, the upper edges of the base are stiffened and reinforced by a strip 5 which, beginning inside the base, is bent outwardly and downwardly to define a channel receiving the edge of the sides and ends, then outwardly at 5a and reversely inwardly and downwardly at 5b. The sides and ends are secured within the channel as by spot welding or soldering whereby the sides and ends are greatly reinforced and stiffened while at the same time is formed an external flange or ledge 6 on which rests the lower edge of an upper section, presently to be described.

Although the size is subject to variation as desired, a practical size of base would be about as follows: width—15", length—24" and height—5". Ledge 6 may be one-half inch below the top edges.

A funnel or spout is indicated at 7, and, as shown upon Figures 1, 2 and 3, is in the general form of a half-cone having its two edges secured to the vertical exterior of an end 4, over and about a hole 8 in the end. As best shown upon Figure 3, the spout is notched to accommodate the continuous portions of flange 6 and has its top edge about coplanar with the top edges of the base 1. By this construction water or other liquids may be easily introduced into the base without removal of the top portion.

An inner section 9 is provided and consists of a rectangular sheet metal frame sized to have a smooth fit within the base 1 and an over-all height a little less, say one-half inch, than the height of the base. Thus, as shown upon Figure 2, the inner section may be formed of a length or strip of sheet metal 10 bent into the form of a rectangle of appropriate size and having its top and bottom edges turned outwardly through equal distances to form top and bottom flanges 11 and 12 such that the completed item has a smooth fit within the base and may be easily inserted thereinto and removed therefrom. A series of spaced holes 13 are formed in and along the bottom edge of the insert or inner section to afford seepage of water into the soil within the enclosure formed by the inner section and the bottom of base 1. It is also to be noted that upper flanges 11 are integrally united at the corners, as by filler pieces soldered or welded to the flanges, to add rigidity to the structure.

A top section is generally identified at 14 and comprises an item built up from sheet metal, glass and angle sections, including gable ends such as 15 whose sloping edges may conveniently make an angle of 90° and connected by parallel side pieces 16 as by machine screws, spot welding or soldering, to flanges formed by the bent ends of gable ends 15. Preferably, the bottom edges of the parts 15 and 16 are to a width of about one-half inch, are turned outwardly and upwardly to form a thickened reinforcement therealong. The inner dimensions of the bottom edges of this top section are such as to enable the same to fit smoothly down over the base 1 and to rest upon and be supported by flange 6. As clearly shown upon Figures 1, 3 and 5, the top of each of the gable ends is truncated at 17 and is provided with holes 18 which serve both as ventilator openings and lifting means for the top section.

The sloping edges of ends 15 as well as the top edges of sides 16 are bent inwardly to form flanges 15a (see Figures 3 and 5) so that the flanges on each sloping roof portion are coplanar. Strips of metal 19 are bent into Z cross sectional shape, as best shown upon Figure 4, to define end flanges 19a and 19b connected by a riser 19c. From this figure it will be noted that the sum of the widths of flanges 19a and 19b is about equal to the width of flanges 15a and that riser 19c has a width such that flange 19b and the underlying portion of flange 15a form a channel 20 within which the side and lower edges of the panes 21 have a smooth sliding fit.

A ridge piece or strip 22, which may be of metal such as aluminum or of any other suitable material, is bent at 90° along a central longitudinal line and has its edges doubled under for reinforcement, as shown upon Figure 5. The ridge piece has a length to provide overhang at each of its ends, where it is provided with holes as at 24, Figure 6, to receive a threaded rod 25. One end of this rod is fixed in any suitable manner with an offset end 26a of a hold down strap 26 clearly shown upon Figure 6 to consist of an elongated strip of sheet metal doubled back upon itself and having its free lower ends extending over the sides of the respective gable ends to which the ends are secured as by spot welding.

By this construction the two glass planes 21 may be slid downwardly with their end edges in the respective channels 20, until the lower edge of each engages within the corresponding channel formed by the part 19 of each side piece 16. After this, ridge piece 22 is assembled with holes 24 fitting over rods 25 and wing nuts 27 are threaded onto the rods to complete the assembly. The ridge piece performs the functions of (a) closing the gap between the subjacent edges of the glass panes, (b) holding the panes against withdrawal from their channels and (c) uniting the gable ends against separation.

The use of the invention will, in general, be clear from the foregoing description. With top section 14 removed, inner section 9 is lowered into the base section to the position shown in Figure 3. Soil is then placed in the inner section to the desired level a little below top flanges 11. The seeds to be started or plants or cuttings to be propagated are then placed in the soil after which the top section is lowered to fit down over and about the base 1 and to rest upon flange or ledge 6. Panes 21 and ridge piece 22 may be assembled before or after assembly of the base and top section. Water and liquid nutrient materials are added as desired by pouring into spout 7. The liquid runs down into the space between the walls of base 1 and inner section 9 and seeps through holes 13 and beneath the bottom edge of the insert into the soil. In addition the walls of the base and insert form a dead-air space which assists in preventing ambient temperature extremes from penetrating to the inside of the assembly.

I have thus provided a seed starting and plant propagating receptacle which has proven extremely effective in the early starting and rapid growth of plants therein. In one instance 100 azalea cuttings were started, 50 in a propagator constructed as disclosed and 50 in the usual manner outside. Of the 50 cuttings within the propagator all grew into fine healthy plants while of those started outside only seven lived and grew into healthy plants. Equally excellent results can be obtained with all other cuttings and seeded plants. By my invention, there is afforded to both commercial and private gardeners a propagator which enables the early start of cuttings and seedlings and rapid healthy growth during the crucial early stages of development. The starter and propagator thus provided may be constructed at a relatively low cost, is simple and easy to use and extremely effective for its intended purpose.

While I have shown a preferred form of the invention, modifications and substitutions of equivalents will occur to those skilled in the art after a study of the foregoing disclosure. Consequently, I do not wish to be limited to the precise details of construction shown. To the contrary, the disclosure should be taken in an illustrative rather than in a limiting sense, and it is my desire and intention to reserve all modifications and substitutions of equivalents within the scope of the subjoined claims.

Having now fully disclosed the invention, what I claim and desire to secure by Letters Patent is:

1. A seed starter and plant propagator comprising a base including a flat rectangular bottom and side and end walls upstanding about the periphery of said bottom to form a liquid-tight receptacle, a reinforcing flange integral with and exteriorly of said walls below the upper edges thereof, and a top section including gable ends and side pieces interconnecting said gable ends, channel pieces secured to and extending along the coplanar top edges of said gable ends and side pieces to receive and hold in angular sloping relation, the respective ones of a pair of panes of translucent sheet material, said top section being constructed and arranged to removably and smoothly fit over and about the upper edges of said base and to rest upon said flange, a pair of threaded rods each secured in upright position to the upper central portion of a respective one of said gable ends, a ridge piece comprising an angle section of length greater than the distance between said gable ends and having a pair of holes to fit down over respective ones of said threaded rods, and nuts threaded onto said rods to hold said ridge piece to said gable ends, said ridge piece being adapted to cover the subjacent joint between the panes of translucent material and interconnect the ridge portions of said gable ends.

2. A seed starter and plant propagator as recited in claim 1, and an inner section including vertical side walls having outwardly extending upper and lower flanges about their upper and lower edges, said flanges being adapted to have a smooth fit within said base, said upper flange being below the upper edge of said base when said lower flange rests on said bottom, whereby to form an enclosed air space between the walls of said base and inner section.

3. A seed starter and plant propagator as recited in claim 2, there being a filling opening through the upper portion of one wall of said base, and a filling spout secured to said one wall over and about said opening.

References Cited in the file of this patent

UNITED STATES PATENTS

| | | |
|---|---|---|
| 195,094 | Crowther | Sept. 11, 1877 |
| 1,305,434 | Barlow | June 3, 1919 |
| 2,058,934 | Yohe | Oct. 27, 1936 |

FOREIGN PATENTS

| | | |
|---|---|---|
| 355,347 | Great Britain | Aug. 24, 1931 |